United States Patent
Di Santo et al.

(10) Patent No.: US 10,796,462 B2
(45) Date of Patent: Oct. 6, 2020

(54) COLOR COMPOSITE GEOLOGICAL IMAGE FROM WELL LOG MEASUREMENTS

(71) Applicant: Schlumberger Technology Corporation, Sugar Land, TX (US)

(72) Inventors: Simone Di Santo, Clamart (FR); Carlos Maeso, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/275,598

(22) Filed: Feb. 14, 2019

(65) Prior Publication Data

US 2020/0265615 A1 Aug. 20, 2020

(51) Int. Cl.
| | |
|---|---|
| *G06T 11/00* | (2006.01) |
| *G06T 11/60* | (2006.01) |
| *G06T 7/00* | (2017.01) |
| *E21B 44/02* | (2006.01) |
| *E21B 49/00* | (2006.01) |
| *E21B 21/08* | (2006.01) |
| *E21B 45/00* | (2006.01) |
| *E21B 47/002* | (2012.01) |

(52) U.S. Cl.
CPC .......... *G06T 11/001* (2013.01); *E21B 47/002* (2020.05); *E21B 49/00* (2013.01); *G06T 11/60* (2013.01)

(58) Field of Classification Search
CPC combination set(s) only.
See application file for complete search history.

(56) References Cited

U.S. PATENT DOCUMENTS

| | | | | |
|---|---|---|---|---|
| 2007/0112521 A1* | 5/2007 | Akimov | ........... | E21B 47/12 702/6 |
| 2011/0221883 A1* | 9/2011 | Johnston | ........... | G01V 1/46 348/85 |
| 2012/0089379 A1* | 4/2012 | Conrad | ........... | G01V 1/40 703/2 |
| 2014/0292764 A1* | 10/2014 | Elkington | ........... | G06T 11/00 345/440 |
| 2015/0241591 A1* | 8/2015 | Burmester | ........... | G01V 3/20 702/7 |
| 2016/0195638 A1* | 7/2016 | Ly | ........... | G01J 3/0264 250/255 |

(Continued)

OTHER PUBLICATIONS

G. Wyszecki, W. S. Stiles (2000)—Basic Colorimetry Concepts and CIE Lab Colorimetric System: Color Science Concepts and Methods, Quantitative Data and Formulae (2nd ed.). Wiley Classics Library Edition, ISBN 0-471-39918-3, (Chapter 3—pp. 117-143, pp. 156-173).

(Continued)

*Primary Examiner* — Wesner Sajous

(57) ABSTRACT

Well log data may be used in well log operations by facilitating the identification of hydrogen carbon deposits. More specifically, the well log data may be used to generate visual representations. Aspects of the present disclosure relate to generating a color composite image based on multiple types of well log data and transforming the well log data into a color space. In further embodiments, the color composite image may be modified and/or objects within the color composite image may be identified.

20 Claims, 13 Drawing Sheets
(7 of 13 Drawing Sheet(s) Filed in Color)

(56) References Cited

U.S. PATENT DOCUMENTS

| | | | |
|---|---|---|---|
| 2017/0103554 A1* | 4/2017 | Elkington | G06T 11/00 |
| 2017/0145806 A1* | 5/2017 | San Martin | E21B 47/0002 |
| 2018/0120477 A1* | 5/2018 | He | G01V 11/002 |
| 2019/0309614 A1* | 10/2019 | Benson | E21B 49/005 |

OTHER PUBLICATIONS

G. Wyszecki, W. S. Stiles (2000)—Three Dimensional Color Spaces and Color-Difference Formulae: Color Science Concepts and Methods, Quantitative Data and Formulae (2nd ed.). Wiley Classics Library Edition, ISBN 0-471-39918-3 (Appendix—pp. 825-830).

Hunt, R. W. G (2004). The Colour Triangle: The Reproduction of Colour (6th ed.). Chichester UK: Wiley—IS&T Series in Imaging Science and Technology. ISBN 0-470-022425-9, (Chapter 7, Par 7.5, 1192-1273).

Morton J. Canty (2010)—Panchromatic Sharpening: Image Analysis Classification and Change Detection in Remote Sensing (2nd ed.) ISBN 978-1-4200-8713-0, (Chapter 5 Image Enhancement and Correction, Par 5.3, pp. 150-159).

Jan J. Koenderink (2010)—Basic Colorimetry: Color for the Sciences—ISBN 978-0-262-01428, (Chapter 4, pp. 99-120).

Jan J. Koenderink (2010)—The Grassman Model: Color for the Sciences—ISBN 978-0-262-01428, (Chapter 5, pp. 167-173).

Jan J. Koenderink (2010)—The Local Model: Color for the Sciences—ISBN 978-0-262-01428, (Chapter 5, pp. 178-185).

Jan J. Koenderink (2010)—Polichromatic Color Composition: Color for the Sciences—ISBN 978-0-262-01428, (Chapter 5, pp. 197-205).

Jan J. Koenderink (2010)—The RGB Cube: Color for the Sciences—ISBN 978-0-262-01428, (Chapter 14, pp. 563-601).

Al-Mutwali, T. Zhang, C. Shrivastava, S. Yang, L. Comparon, S. Al-Ofi (2017)—A New Laboratory SCAL Device and Processing Method for OBM Vug Density Quantification—SPE-183680-MS, Manama, Kingdom of Bahrain, Mar. 6-9, 2017 (20 pages).

Vrabel, J. (1996) Multispectral imagery band sharpening study. Photogrammetric Engineering and Remote Sensing, 62(9), p. 1075-1083.

Welch, R. and Ahlers, W. (1987) Merging Multiresolution POT HRV and LANDSAT TM data. Photogrammetric Engineering and Remote Sensing, 53(3), p. 301-303.

Ranchin, T and Wald, L. (2000). Fusion of high spatial and spectral resolution images: The ARsis concept and its implementation. Photogrammetric Engineering and Remote Sensing, 66(1), p. 49-61.

Aiazzi, B., Alparone, L, Baronti, S., and Garzelli, A. (2002). Context-Driven fusion of high spatial and spectral resolution images based on oversampled multiresolution analysis. IEEE Transaction on Geoscience and Remote Sensing, 40(10), p. 2300-2312.

T. Blaschke and J. Strobl (2001), What's Wrong with Pixels? Some Recent Developments Interfacing Remote Sensing and GIS, Zeitschrift fur Geoinformationssysteme, vol. 14, No. 6, pp. 12-17.

Benz, U.C., Hoffmann, P., Willhauck, G., Lingfelder, I., and Heynen, M. (2004). Multiresolution, object-oriented fuzzy analysis of remote sensing data for GIS-ready information. ISPRS Journal of Photogrammetry & Remote Sensing, vol. 58, pp. 239-258.

T. Blaschke, S. Lang, G. J. Hay (2008), Object-based image analysis for remote sensing applications: modeling reality—dealing with complexity: Object-Based Image Analysis Spatial Concepts for Knowledge-Driven Remote Sensing Applications. e-ISBN: 978-3-540-77058-9, Chapter 1.1, (47 pages).

Blaschke, T. Object based image analysis for remote sensing. ISPRS J. Photogramm. Remote Sens. 2010, vol. 65, pp. 2-16.

Gibbes, C.; Adhikari, S.; Rostant, L.; Southworth, J.; Qiu, Y. Application of object based classification and high resolution satellite imagery for Savanna ecosystem analysis. Remote Sens. 2010, 2, pp. 2748-2772.

Lucas, R.M.; Medcalf, K.; Brown, A.; Bunting, P.J.; Breyer, J.; Clewley, D.; Keyworth, S.; Blackmore, P. Updating the Phase 1 habitat map of Wales, UK, using satellite sensor data. ISPRS J. Photogramm. Remote Sens. 2011, vol. 66, pp. 81-102.

Heumann, B.W. An object-based classification of Mangroves using a hybrid decision tree—Support vector machine approach. Remote Sens. 2011, vol. 3, pp. 2440-2460.

* cited by examiner

COLOR COMPOSITE GEOLOGICAL IMAGE FROM WELL LOG MEASUREMENTS

BACKGROUND

This disclosure generally relates to transforming well log measurement data to generate a color composite image to improve oil and gas production decisions.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed deep into the wellbore. The downhole well-logging tools may generate multiple complementary measurements that may be used to infer properties or characteristics of the geological formation surrounding the wellbore. Each of the multiple measurements are represented as well logs, which an operator or analyst can use to make decisions regarding hydrocarbon deposits (e.g., where to drill) and/or potential subsurface areas to avoid. As the volume of information from well logs increases, however, it may be increasingly challenging to identify certain information useful for decisions involved in oil and gas production or exploration.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

One embodiment in accordance with aspects of the present disclosure relates to a system. The system includes a processor and a memory storing instructions configured to be executed by the processor. The instructions include instructions to receive a first borehole image data related to a first type of well log data of a borehole representative of a first parameter of a borehole, wherein the first borehole image data comprises a first plurality of pixels. Further, the instructions includes instructions to receive a second borehole image data related to a second type of well log data of the borehole representative of a second parameter of the borehole, wherein the second borehole image data comprises a second plurality of pixels, wherein a location in the borehole associated with one or more of the first plurality of pixels corresponds to the same location in the borehole associated with one or more of the second plurality of pixels. Further still, the instructions include instructions to generate a color composite borehole image data based at least in part on a transformation of the first borehole image data and the second borehole image data into different axes of a color space.

Another embodiment in accordance with aspects of the present disclosure relates to a method. The method includes receiving a first borehole image data related to a first type of well log data representative of a first parameter of a borehole, wherein the first borehole image data comprises a first plurality of pixels. Further, the method includes receiving a second borehole image data related to a second type of well log data representative of a second parameter of the borehole, wherein the second borehole image data comprises a second plurality of pixels. Further still, the method includes receiving a third borehole image data related to a third type of well log data, wherein the third borehole image data comprises a third plurality of pixels, wherein a location within a geological formation associated with one or more of the first plurality of pixels, one or more of the second plurality of pixels, and one more of the third plurality of pixels at least partially overlaps. Further still, the method includes transforming each pixel value of at least a portion of the first plurality of pixels into a first axis of a color space to generate a modified first borehole image data. Further still, the method includes transforming each pixel value of at least a portion of the second plurality of pixels into a second axis of the color space to generate a modified second borehole image data. Further still, the method includes transforming each pixel value of at least a portion of the third plurality of pixels into a third axis of a color space to generate a modified third borehole image data. Further still, the method includes generating a color composite borehole image data based at least in part on a combination of the modified first borehole image, the modified second borehole image, and the modified third borehole image. Even further, the method includes generating a pansharpened borehole image data based on least in part on a combination of the color composite borehole image data and a fourth borehole image data related to a fourth type of well log data.

Another embodiment in accordance with aspects of the present disclosure relates to a method for identifying one or more geological features using a color composite borehole image. The method includes receiving a first borehole image data related to a first type of well log data, wherein the first borehole image data comprises a first plurality of pixels. The method also includes receiving a second borehole image data related to a second type of well log data, wherein the second borehole image data comprises a second plurality of pixels. Further, the method includes receiving a third borehole image data related to a third type of well log data, wherein the third borehole image data comprises a third plurality of pixels, wherein a location of one or more of the first plurality of pixels correlates to a location of one or more of the second plurality of pixels. Further still, the method includes transforming each pixel value of at least a portion of the first plurality of pixels into a first axis of a color space to generate a modified first borehole image data. Further still, the method includes transforming each pixel value of at least a portion of the second plurality of pixels into a second axis of the color space to generate a modified second borehole image data. Further still, the method includes transforming each pixel value of at least a portion of the third plurality of pixels into a third axis of a color space to generate a modified third borehole image data. Further still, the method includes generating the color composite borehole image based at least in part on a combination of the modified first borehole image data, the modified second borehole image data, and the modified third borehole image data. Even further, the method includes identifying the one or more geological features within the color composite borehole image based at least in part on identified feature vectors of at least a portion of a plurality of pixels of the color composite borehole image.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various aspects of this disclosure may be better understood upon reading the following detailed description and upon reference to the drawings in which.

DETAILED DESCRIPTION

Figure 1:
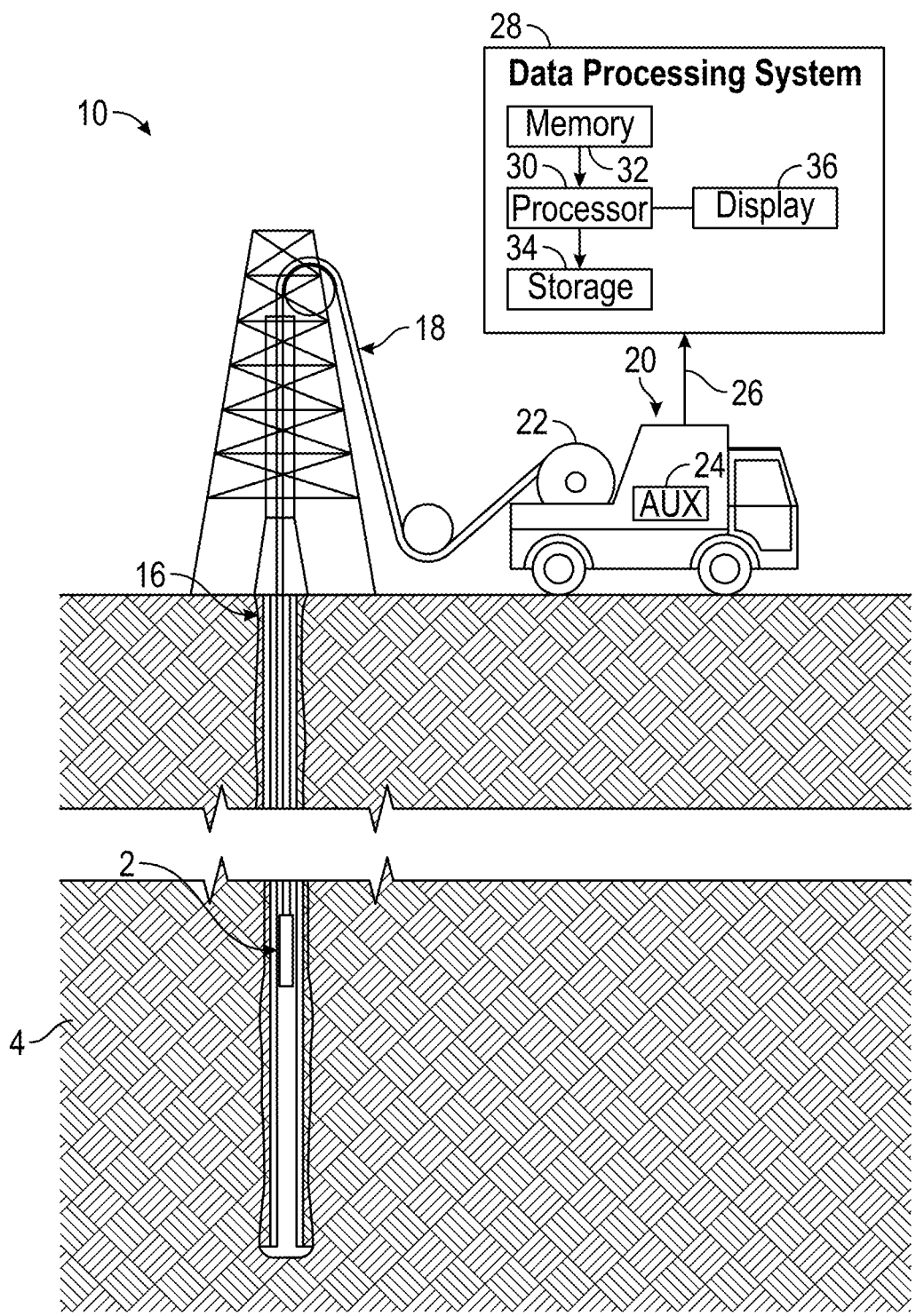
FIG. 1 shows an example wireline, slickline or coiled tubing conveyed downhole tool moving along the interior of a wellbore drilled through subsurface formations, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

In general, oil and gas exploration organizations may make certain oil and gas production decisions, such as determining where to drill, based on well log data. The well log data may be generated from a downhole tool that employs multiple well log measurements such as density, resistivity, photoelectric absorption properties, neutron spectroscopy, and the like. Certain techniques for informing the production decisions based on the well log data involve transforming the well log data into one or more visual representations (e.g., graphs and/or image data) that are presented as hard copies or on an electronic display, where each visual representation may depict data resulting from one of the well log measurements. In particular, the image or visual representation of the well log data represents the values of a measurement in each portion of a wellbore surface, in two dimensions. Each portion of the surface is represented by a pixel of the image.

One aspect of the present disclosure relates to generating a color composite well log visualization based on well log data from at least two types of well log measurements. The resulting color composite well log visualization may enable much more efficient identification of information useful for decisions involved in oil or gas production or exploration. In this way, the color composite well log visualization of this disclosure provides an improvement in the field of oil or gas production or exploration, as better oil or gas production or exploration decisions lead to more efficient and effective activities taken in oil or gas production or exploration. The composite well log visualization (e.g., color composite image) may be generated by transforming the well log data and/or pixels of the plurality of visual representations from multiple well log measurements via a color-mapping for instance so that all of them may be visualized jointly on one unique visual representation. As used herein, "color-mapping" refers to transforming at least one set of data (e.g., an image) into a color space or a component (e.g., basis set) of a color space. The color composite image includes pixels each having a value representing a combination of multiple well log measurements. As such, the value of each pixel of the composite well log visualization may be indicative a petrophysical property, a geological property, and/or an identity of a composition of a region within the geological formation. Further, it should be appreciated that multiple well log measurements may be complementary techniques. That is, two or more different well log measurements may provide a more accurate description of the composition of the region. Therefore, the color composite image provides clearer information for informing certain oil and gas production decisions by showing details of a geological formation that could not be seen with certain existing techniques.

With this in mind, FIG. 1 illustrates a well-logging system 10 that may employ the systems and methods of this disclosure. The well-logging system 10 may be used to convey one or more downhole tools 12 through a geological formation 14 via a wellbore 16. The downhole tool 12 may be conveyed on a cable 18 via a logging winch system 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, although the downhole tool 12 is described as a wireline downhole tool, it should be appreciated that any suitable conveyance may be used. For example, the downhole tool 12 may instead be a logging-while-drilling (LWD) tool as part of a bottom hole assembly (BHA) of a drill string, conveyed on a slickline or via coiled tubing, and so forth. Similarly the cable 18 or any other conveyance means may comprise a toolstring including a plurality of downhole tools. Each downhole tool may comprise one or more sensors for taking any suitable measurement that obtains logging measurements through depths of the wellbore 16. All or part of the logging measurements are measurements for imaging the formation that measure a parameter and its variation in the wellbore longitudinally and azimuthally (i.e., in two dimensions). For example, such logging measurements may include, but are not limited to, density, resistivity, photoelectric absorption properties, neutron spectroscopy, and the like.

To this end, the data processing system 28 thus may be any electronic data processing system that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be ROM memory, random-access memory (RAM), flash memory, an optical storage medium, or a hard disk drive, to name a few examples. A display 36, which may be any suitable electronic display, may provide a visualization, a well log, or other indication of properties in the geological formation 14 or the wellbore 16 using the induction logging measurements 26.

Figure 2:
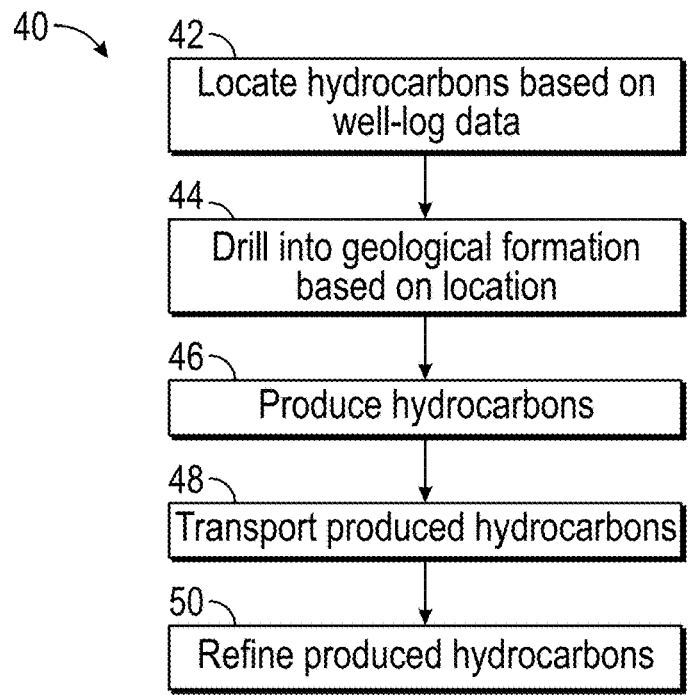
FIG. 2 illustrates a flow chart of various processes that may be performed based on analysis of well logs, in accordance with aspects of the present disclosure.

FIG. 2 illustrates a method 40 of various processes that may be performed based on analysis of well logs, in accordance with aspects of the present disclosure. A location of hydrocarbon deposits within a geological formation may be identified (process block 42) based on well-log data. In some embodiments, the well-log data may be analyzed to generate a map or profile that illustrates regions of interest with the geological formation.

Based on the identified locations and properties of the hydrocarbon deposits, certain positions or parts of the geological formation 14 may be explored (process block 44). That is, hydrocarbon exploration organizations may use the locations of the hydrocarbon deposits to determine locations at the surface of the geological formation 14 to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the geological formation 14, the hydrocarbons that are stored in the hydrocarbon deposits may be produced (block 46) via natural flowing wells, artificial lift wells, and the like. Further, the produced hydrocarbons may be transported (block 48) to refineries and the like via transport vehicles, pipelines, and the like. Further still, the produced hydrocarbons may be processed (block 50) according to various refining procedures to develop different products using the hydrocarbons.

It should be noted that the processes discussed with regard to the method 40 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the geological formation.

Figure 3:
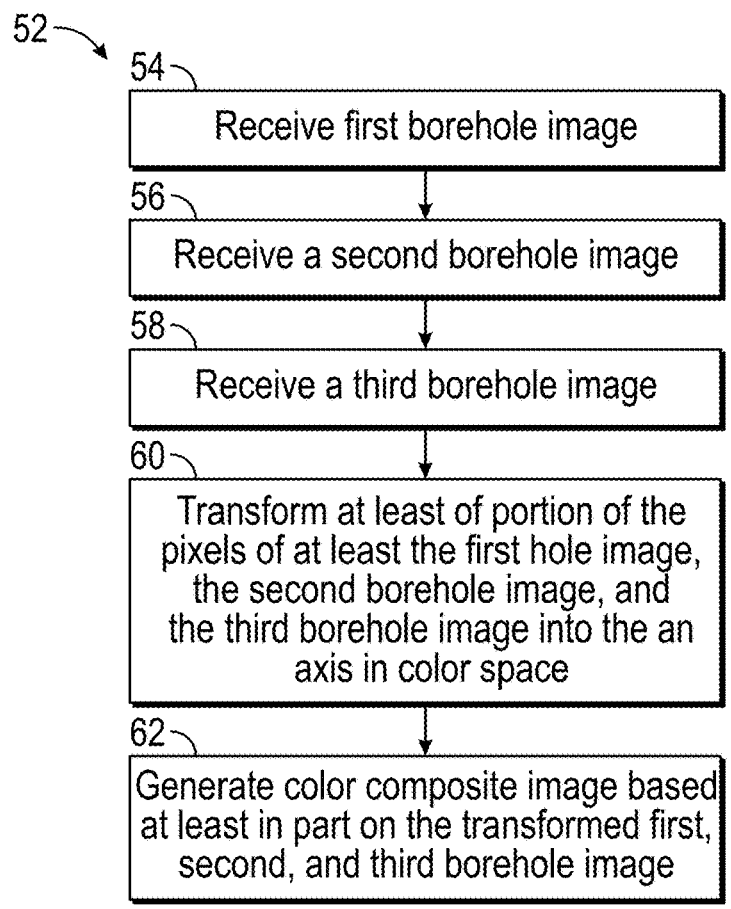
FIG. 3 is a block diagram for generating color composite images, in accordance with aspects of the present disclosure.

FIG. 3 is a flow diagram 52 for generating color composite images, in accordance with aspects of the present disclosure. The elements illustrated in the flow diagram may be performed by the data processing system 28 or any suitable processing system. In general, the color composite image is generated using data from multiple well logs, such as those obtained during MWD and/or LWD. Moreover, the color composite image may be generated in real-time.

The flow diagram 52 may include receiving (process block 54) a first borehole image comprising a first plurality of pixels, each corresponding to a predetermined portion of the formation and having a respective first pixel value that is associated to the measured value of a first parameter in the corresponding predetermined portion. It should be appreciated that well log data indicative of a 2D or 3D region of a geological formation may be received rather than a borehole image (e.g., first borehole image). Additionally, the flow diagram includes receiving (process block 56) a second borehole image comprising a second plurality of pixels each also corresponding to a predetermined portion of the formation and having a respective second pixel value associated to the measured value of a second parameter in the corresponding predetermined portion. Further, the flow diagram 52 includes receiving (process block 58) a third borehole image comprising a third plurality of pixels each also corresponding to a predetermined portion of the formation and having a respective pixel third value associated to the measured value of a third parameter in the corresponding predetermined portion. It should be appreciated that a location of each of the first plurality of pixels, the second plurality of pixels, and the third plurality of pixels are least partially spatially overlaps. Further, the flow diagram 52 includes transforming (process block 60) at least a portion of the pixels of at least the first borehole image, the second borehole image, and the third borehole image into a respective a respective axis in a color space. That is, the values of each pixel of a respective borehole image may be redefined as a value along a basis set of a color space. In some embodiments, the transformation may be linear. However, in certain embodiments, the transformation may be non-linear as certain well logs may be represented on a log-scale (e.g., resistivity). For example, the transformations between the measured properties and the color space may be parabolic, exponential, and so forth. Moreover, one axis may have one type of scaling (e.g., linear or non-linear), while another axis may have a different type of scaling, and moreover, the different functions (e.g., quadratic, exponential) may differ between two axes having non-linear types of scaling. Moreover in some embodiments the function may be different in different parts of the axis, resulting as a composition of multiple functions along the total interval. The type of transfer function between the measurement and the color space axis (linear, non-linear, composite etc.) may be chosen as a function of the range of the measurement for each parameter, in particular its dynamic range (characterizing the order of magnitude between the smallest and largest possible measured quantities). For instance, if a measured parameter had an order of magnitude of 10 between the smallest and largest measured quantities, a linear transformation may be appropriate. On the contrary, if the order of magnitude between the smallest and largest possible measured quantity is about $10^5$, a non-linear such as a logarithmic scale may be more appropriate.

Figure 4:
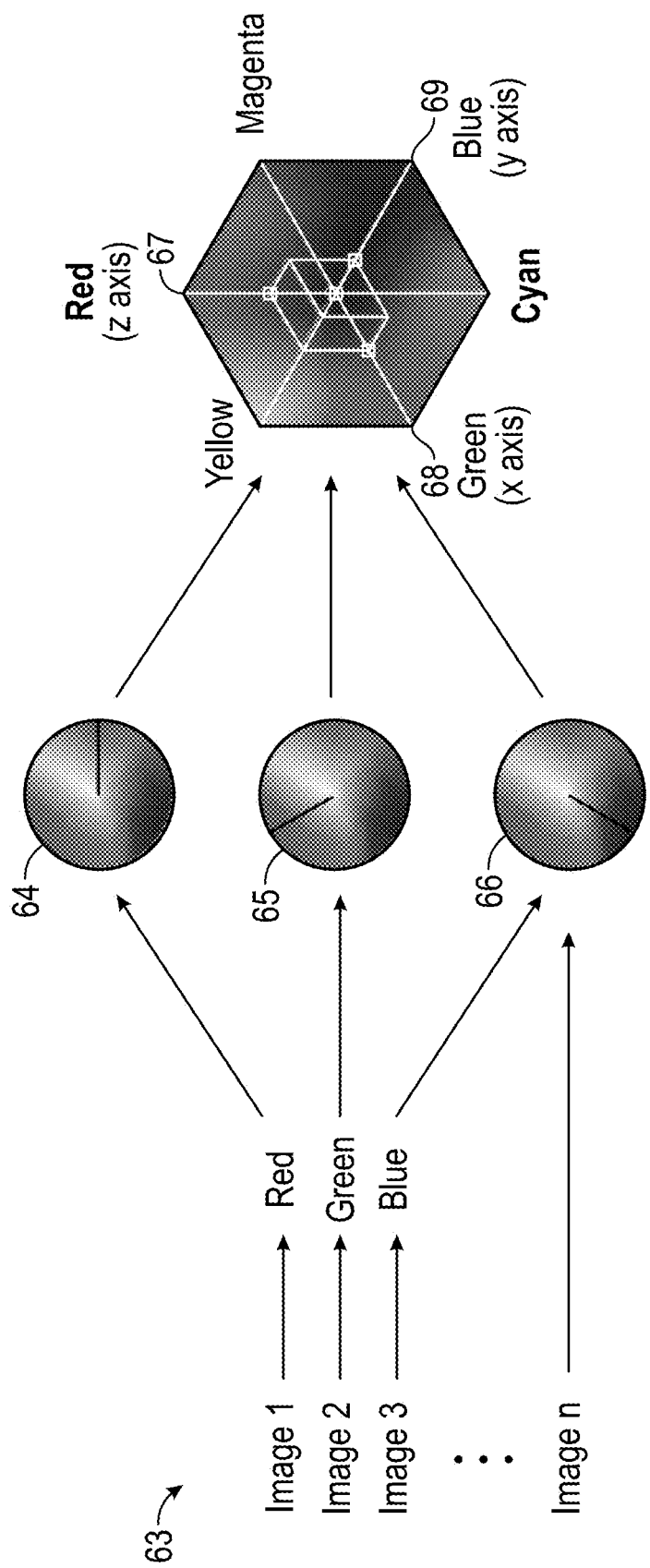
FIG. 4 illustrates a multiple images that are transformed into a color space, in accordance with aspects of the present disclosure.

As a non-limiting example, at least a portion of the pixels of the first borehole image may be transformed into one axis of a color space (e.g., red in RGB (red, green blue) space). Further, at least a portion of the pixels of a second borehole image may be transformed into another axis in color space, such as blue. A color composite imaged form by a combination of the transformed first borehole image and the transformed second borehole image may have pixels with multiple components, or magnitude along a direction of the axes spanning the color space of the color composite image (e.g., each pixel will have a blue component and a red component). Thus, when each pixel may have a value that is indicative of a measured parameter (e.g., resistivity), the transformed pixel has a value between 0 and 255 for corresponding color axis in RGB space determined as a function of the pixel value. In some embodiments, the pixels values of the borehole images may be normalized when transformed into RGB such that the values lie within 0 and 255, 0 being for instance the smallest measured value of the parameter for the image and 255 being the largest. Then, in a generally similar manner, at least a portion of the pixels of the second borehole image may be transformed into an additional axis of the color space, such as green. Further, at least a portion of the pixels of the third borehole image may be transformed into another axis of the color space, such as blue. As an example, FIG. 4 shows multiple image 63 that are each transformed into an axis (e.g., a red axis indicated by the line in the grey scale image 64 representing an RGB color space, a green axis as indicated by the line in the grey scale image 65 representing an RGB color space, and a blue axis as indicated by the line in the grey scale image 66 representing an RGB color space. The projection of each images may form a color composite image, as discussed herein. Each pixel of the color composite image may include one or more values indicative of a component of each image 63 on the red axis 67, green axis 68, and blue axis 69.

It should be appreciated that the vectors may be represented in various notations. For example, in RGB color space (e.g., RGB space) components may be represented as a number before 0 to 1 with any fractional value in between. It should be appreciated that this may be useful for certain theoretical analyses, and in systems that use floating point representations. In other embodiments, the RGB components may be represented as a percentage (e.g., between 0% and 100%). In other embodiments, the RGB components may be represented as integer numbers in a digital 8-bit per channel (e.g., between 0 and 255) or in an equivalent hexadecimal representation. In other embodiments, the RGB components may be represented in digital 16-bit per channel (e.g., between 0 and 65535), or 25-bits, 32-bits, 48-bits, 64-bits or more. As such, the RGB components of the transformed images and/or the color composite image data may be represented in various forms.

Then, the flow diagram 52 involves generating (e.g., process block 62) a color composite borehole image based at least in part on a combination of the modified first borehole image, the modified second borehole image, and the modified third borehole image, such as the value of the transformed first, second and third pixels. The color composite well log image data may then be used to generate or render a color composite well log image. It should be appreciated that rather than receiving a borehole image, the process blocks 54, 56, 58, 60, and 62 may be directed towards image data that includes values indicative of pixel values of an image. In some embodiments, at least one of the borehole images may be image data. Further, the color composite image may be color composite image data.

Figure 5:
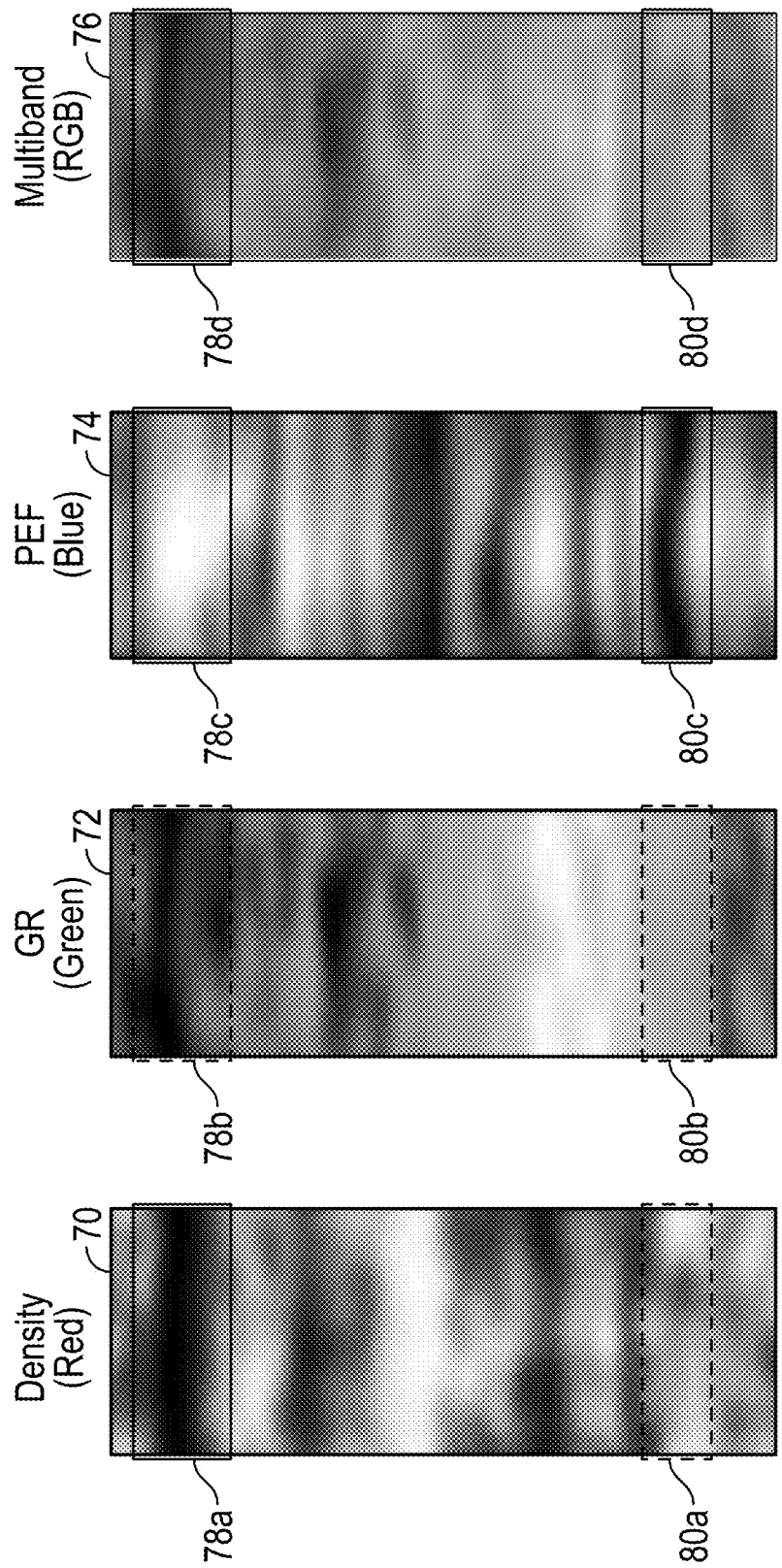
FIG. 5 shows a first example of three well logs are used to generate a first color composite image, in accordance with aspects of the present disclosure.

As a non-limiting example to help illustrate the elements in the flow diagram 52 of FIG. 3, FIG. 5 shows a first example of three images 70, 72, and 74 that were used to generate a first color composite image 76, in accordance with aspects of the present disclosure. In general, the images 70, 72, and 74 are visual representations indicative of well log data from three types of measurements or parameters (e.g., density for the image 70, gamma ray (GR) for the image 72, and photoelectric factor (PEF) for the image 74). In each of the images 70, 72, and 74, an area of interest 78 and 80 is shown (e.g., generally indicated by the boxes).

The first color composite image 76 is generated based on the images 70, 72, and 74, as discussed herein. The pixel values of image 70 were transformed into the red axis of RGB space, the pixel values of image 72 were transformed into the green axis of RGB space, and the pixel values of image 74 were transformed into the blue axis of RGB space. Thus producing a first transformed image (e.g., or image data) corresponding to image 70, a second transformed image corresponding to image 72, and a third transformed image corresponding to image 74. Then, the three transformed images (e.g., the first transformed image, the second transformed image, and the third transformed images) are combined to generate the first color composite image 76. For example, it should be appreciated that the three images 70, 72, and 74 are generally of a same region of a geological formation. Thus, a pixel of the image 70 may have a position within the geological formation that generally correlates with a position of a pixel of the images 72 and/or 74. In this way, each pixel from each image 70, 72, 74 may be combined (e.g., or added together) to generate a fourth image (e.g., first color composite image 76) where each position of a pixel of the first color composite image 76 generally correlates with the positions of the pixels of each of the images 70, 72, and 74. As such, the first color composite image 76 shows the data from all three of the images 70, 72, and 74 in a single image and with a higher contrast. When focusing on area of interest 78, 80 (represented as 78a, 80a on first image, 78b, 80b on second image, 78c, 80c on the third image and 78d, 80d on the fourth image), one of ordinary skill may appreciate that on the first color composite image has added value regarding the two area of interest relative to each of the images 70-74 taken alone or in combination. In particular, in the first color composite image, it is very clear that the layer in area of interest 78*d* is of a different composition relative to the other portions of the wellbore, which cannot be seen in any of the images 70-74. Similarly, in area of interest 80*d*, the first color composite image 76 shows a local heterogeneity (in green) in a layer (in yellow) which cannot be derived with certainty from each image separately or even with separate images interpreted together. Therefore, the color composite image enables to derive geological property of the formation, such as lithology, including layer and boundary location and composition and identification of heterogeneities, such as vugs, fracture, etc.

Figure 6:
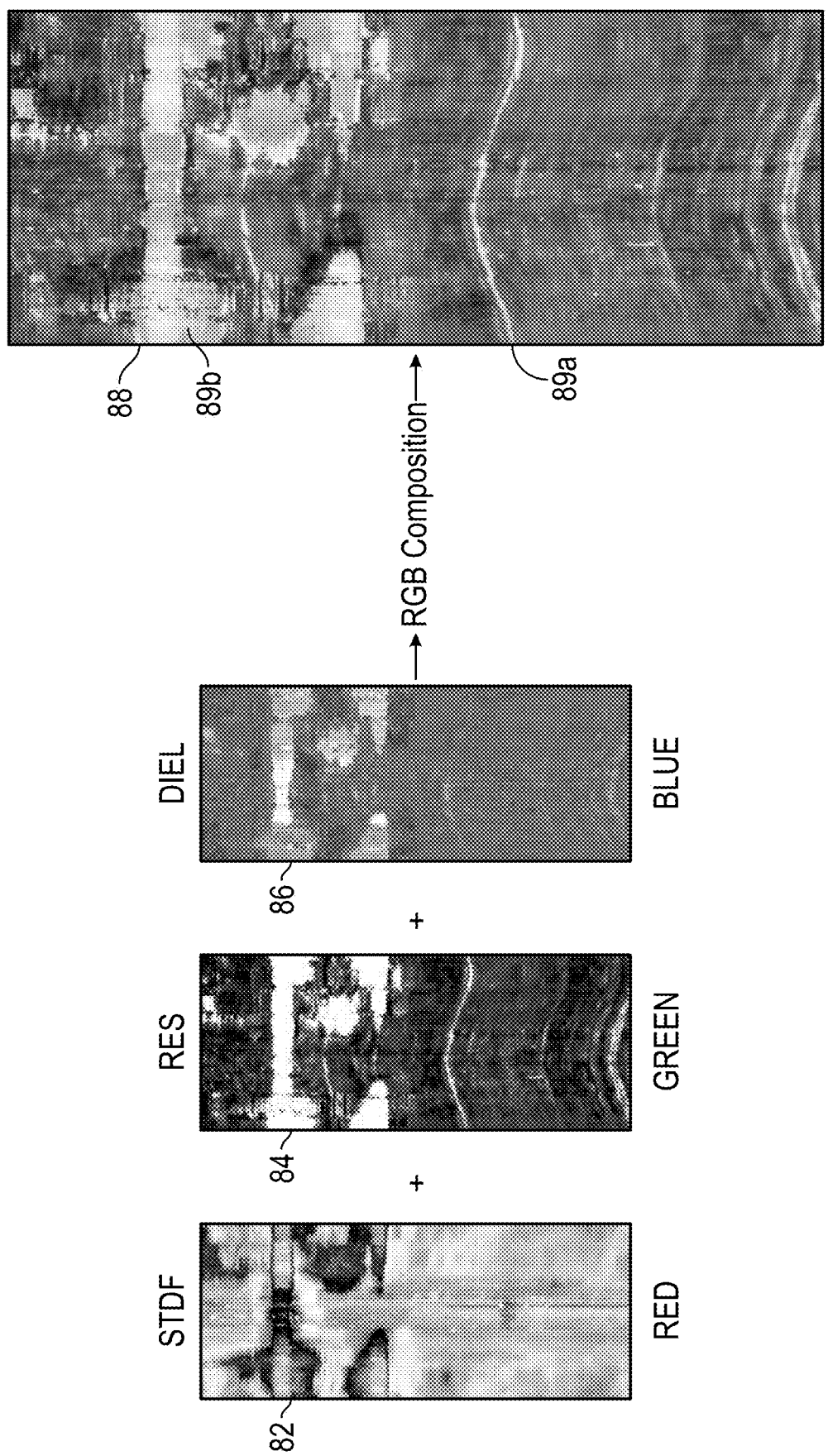
FIG. 6 shows a second example of three well logs are used to generate a second color composite image, in accordance with aspects of the present disclosure.

As another non-limiting example to help illustrate the elements in the flow diagram 52 of FIG. 3, FIG. 6 shows a second example of three high-resolution images 82 (representative of the standoff between the downhole tool and the formation), 84 (representative of the formation resistivity), and 86 (representative of the formation dielectric parameter) that were used to generate a second color composite image 88, in accordance with aspects of the present disclosure. In a generally similar manner as discussed above with respect to FIG. 4, the pixels of image 82 were transformed into red space of RGB, the pixels of image 84 were transformed into green space of RGB, and the pixels of image 86 were transformed into blue space of RGB. Thus, the second color composite image 88 has pixels with values that are based on a combination (e.g., a sum) of the pixels from the transformed pixels from images 82, 84, and 86. In general, the second color composite image 88 includes regions (e.g., a location of one or more pixels) that have different colors as a result of the transformation of the images 82, 84, and 86. These colors may be indicative of a formation composition, such as a clay, oil, water, and the like. As such, the second color composite image 88 makes it clearer where certain regions of interest (e.g., regions having particular compositions) are. In particular, the second color composite image 88 shows (in yellow) small sand layers that are not clearly visible on the images 82-86 as shown by arrow 89*a*. Further, we can also see at location 89*b* a borehole washout which is emphasized by the blue color showing the standoff increases. Therefore, combining such parameters enables determination of geological parameters, such as lithology as already discussed, but also borehole rugosity or fracture aperture for instance.

Figure 7:
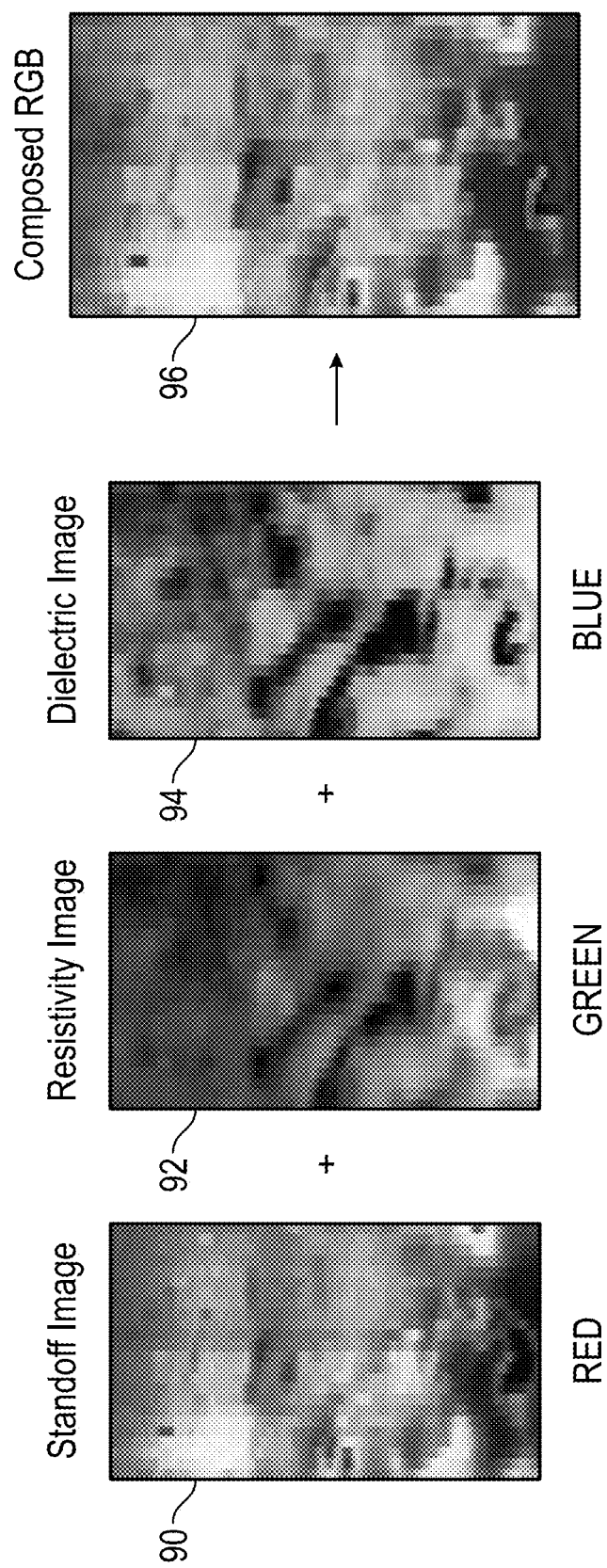
FIG. 7 shows a third example of three well logs are used to generate a third color composite image, in accordance with aspects of the present disclosure.

As yet another non-limiting example to help illustrate the elements in the flow diagram 52 of FIG. 3, FIG. 7 shows a third example of three images 90, 92, and 94 were used to generate a third color composite image 96, in accordance with aspects of the present disclosure. The image 90 relates to a stand-off, the image 92 relates to resistivity well log data, and the image 94 relates to dielectric well log data. In a generally similar manner as discussed above with respect to FIGS. 4 and 5, the pixels of image 90 were transformed into red space of RGB, the pixels of image 92 were transformed into green space of RGB, and the pixels of image 94 were transformed into blue space of RGB. Thus, the color composite image 96 has pixels with values that are based on a combination (e.g., a sum) of the pixels from the transformed pixels from images 90, 92, and 94. It is to be noted that the transfer function of the standoff image 90 has been set up so that the standoff data does not vary significantly in the red space but only in order to enhance the visualization of the other images. The color composite image shows clearly two different spaces (blue and green) corresponding to the type of fluid inside of the formation (green for oil, situated in vugs, and blue for water). Such color composite image therefore also enables to determine petrophysical properties of the formation and in particular fluid typing and secondary porosity.

While the images discussed in FIGS. 4-6 were transformed into basis sets (e.g., along red, blue, and green axes) of RGB space, it should be appreciated that in some embodiments other color spaces may be used, such as hue saturation, and lightness (HSV), hue saturation and value (HSV), sRGB, CIE RGB, YIQ, and the like. Further, in some embodiments, the well bore images may be transformed into a color space with more than three coordinates, such as cyan, magenta, yellow, and black CYMK. It is possible as well to apply the disclosure to a combination of two images with a dichromatic color space.

Further, the transfer functions may be adapted in order to enhance different features or focus the analysis on one or more particular borehole parameters.

As discussed herein, the color composite image or composite well log visualization (e.g., the first color composite image 76, the second color composite image 88, and the third color composite image 96) may comprise pixels that each have values indicative of a combination of multiple well log measurements. As such, the value of each pixel of the composite well log visualization may be indicative a petrophysical property, a geological property as disclosed above, such as identification of lithology of the formation, layer boundaries, and composition of a region within the geological formation, texture, identification of geological objects such as fracture, vugs, and borehole rugosity, porosity or fluid typing.

Figure 8:
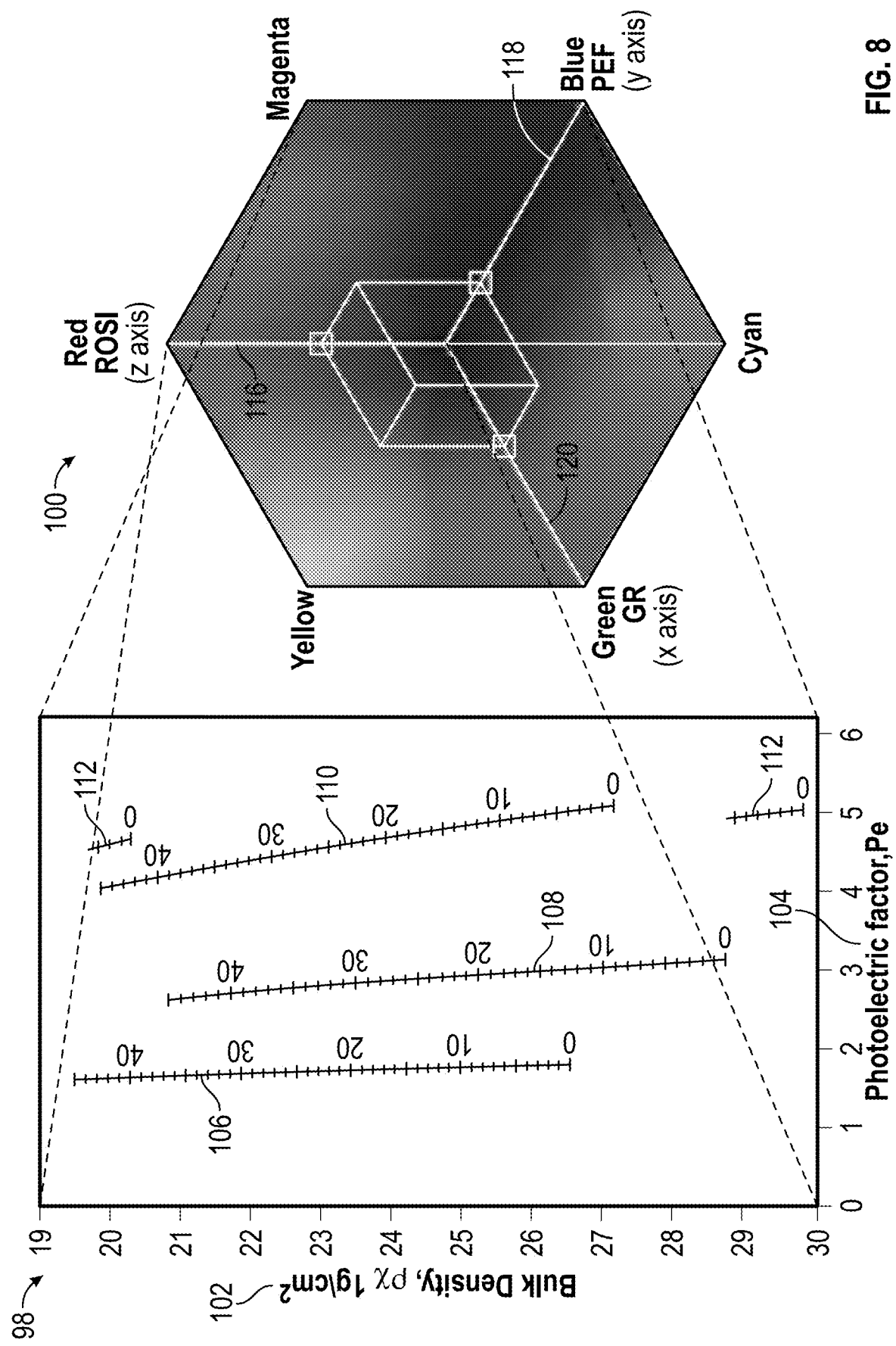
FIG. 8 shows an attribute map and a corresponding RGB (red, green, blue) color plot, in accordance with aspects of the present disclosure.

Regarding the composition of the formation, FIG. 8 shows an attribute map 98 and a corresponding RGB color plot 100 (e.g., axes defining an RGB color space). The attribute map 98 generally illustrates a relationship between four compositions: quartz, dolomite, calcite, salt, and anhydrite, and two properties: bulk density (e.g., plotted on axis 102) and photoelectric factor (e.g., plotted on axis 104).

Each composition is matched to a line 106, 108, 110, 112, and 114, which corresponds to quartz, dolomite, calcite, salt, and anhydrite, respectively. Further, each line 106, 108, 110, 112, and/or 114 may have associated pixel values. As shown, the axis 102 corresponds to red axis 116, and axis 104 corresponds to blue axis 118. As such, each pixel of the color composite image (e.g., the first color composite image 76 that includes the density and photoelectric factor properties) that lies within the plane spanned by the red axis 116 and blue axis 118 (e.g., has a value on the red axis 116 that is between 0 to 255, and a value on the blue axis 118 that is between 0 to 255) may be indicative of one of the compositions. While only the red axis 116 and blue axis 118 are shown, in should be appreciated that the compositions may span the green axis 120 in addition, or a plane spanned by two of the axes (e.g., red axis 116, blue axis 118, and/or green axis 120.) In other words, based on the chart shown on FIG. 8 and a color composite image such as the one of FIG. 4, the composition and porosity of each portion of the formation corresponding to a pixel of the image may be derived, based on the pixel value. This could be easily automatized to create interpretable color composite images.

Another aspect of the present disclosure is directed towards generating a pansharpened well log visualization. As discussed herein, oil and gas exploration organizations may make certain oil and gas production decisions based on well log data. That is, the oil and gas explorations may utilize visual representations of the well log data, such as one or more graphs or images that may each relate to a well log measurement. It is presently recognized that certain visual representations may be enhanced via pansharpening. In general, pansharpening involves combining a low-resolution multispectral image with a high-resolution, monochrome image to generate a high-resolution, pansharpened image. In some embodiments, may be generated using certain techniques such as HSV Fusion, Brovey Fusion, and/or other suitable methods for pansharpening.

Certain multi-resolution approaches to pansharpening involve taking the discrete wavelet transform (DWT) of both the multispectral image and the monochrome image. Then, the next element is to retain the approximation coefficients for the multispectral image but replace the detail coefficients with those from the monochrome image. In some embodiments, instead of just replacing the coefficients, some fusion rule can be used. It should be appreciated that there may be some artifacts in the fused image due to the nature of the DWT (e.g., it is not shift-invariant and lacks directionality) and, thus, the spatial quality of the final fused image is reduced. One approach to overcome this problems is to use the undecimated DWT or other overcomplete transforms such as the curvelet transform or the nonsubsampled contourlet transform.

Figure 9:
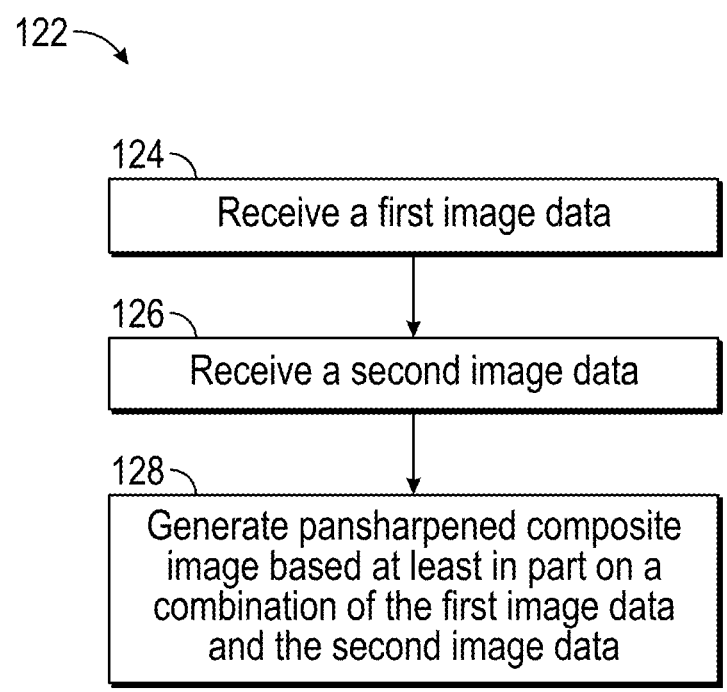
FIG. 9 shows a block diagram for generating a pansharpened composite image, in accordance with aspects of the present disclosure.

FIG. 9 shows a flow diagram 122 for generating a pansharpened composite image, in accordance with aspects of the present disclosure. The blocks illustrated in the flow diagram 122 may be performed by the data processing system 28 or any suitable processing system. In general, the pansharpened image is generated using data from multiple well logs, such as those obtained during MWD and/or LWD. In some embodiments, the flow diagram may 122 be performed after flow diagram 52. That is, the color composite image, or color composite image data, generated in process block 62 may be an input to flow diagram 122, as discussed in more detail below.

The flow diagram 122 may include receiving (process block 124) a first image data and receiving (process block 126) a second image data. In general, the first image data may have a lower resolution than the second image data. Additionally, the first image data may be in color (e.g., contain pixel information that are in a color space, as discussed herein). For example, the first image data may be the color composite image data generated from process block 62, as shown in FIG. 3. The second image is generally an image with higher resolution. Then, the flow diagram 122 may include generating a pansharpened composite image, or image data, based at least in part on a combination of the first image data and the second image data. For example, the combination may include certain methods such as HSV (Hue, Saturation, Value) Fusion, Brovey Fusion, Principle Component Analysis Fusion, Discrete Wavelet Transform Fusion, A' Trous Wavelet Transform Fusion, and/or other suitable methods for pansharpening. For example, in HSV fusion, an RGB image is transformed to the HSV color space (e.g., coordinates), and the value (V) component of the transformed image is replaced with a higher resolution image (e.g., panchromatic gray-scale image) and then reconvert the image from HSV to the RGB color to generate the pansharpened image.

Figure 10:
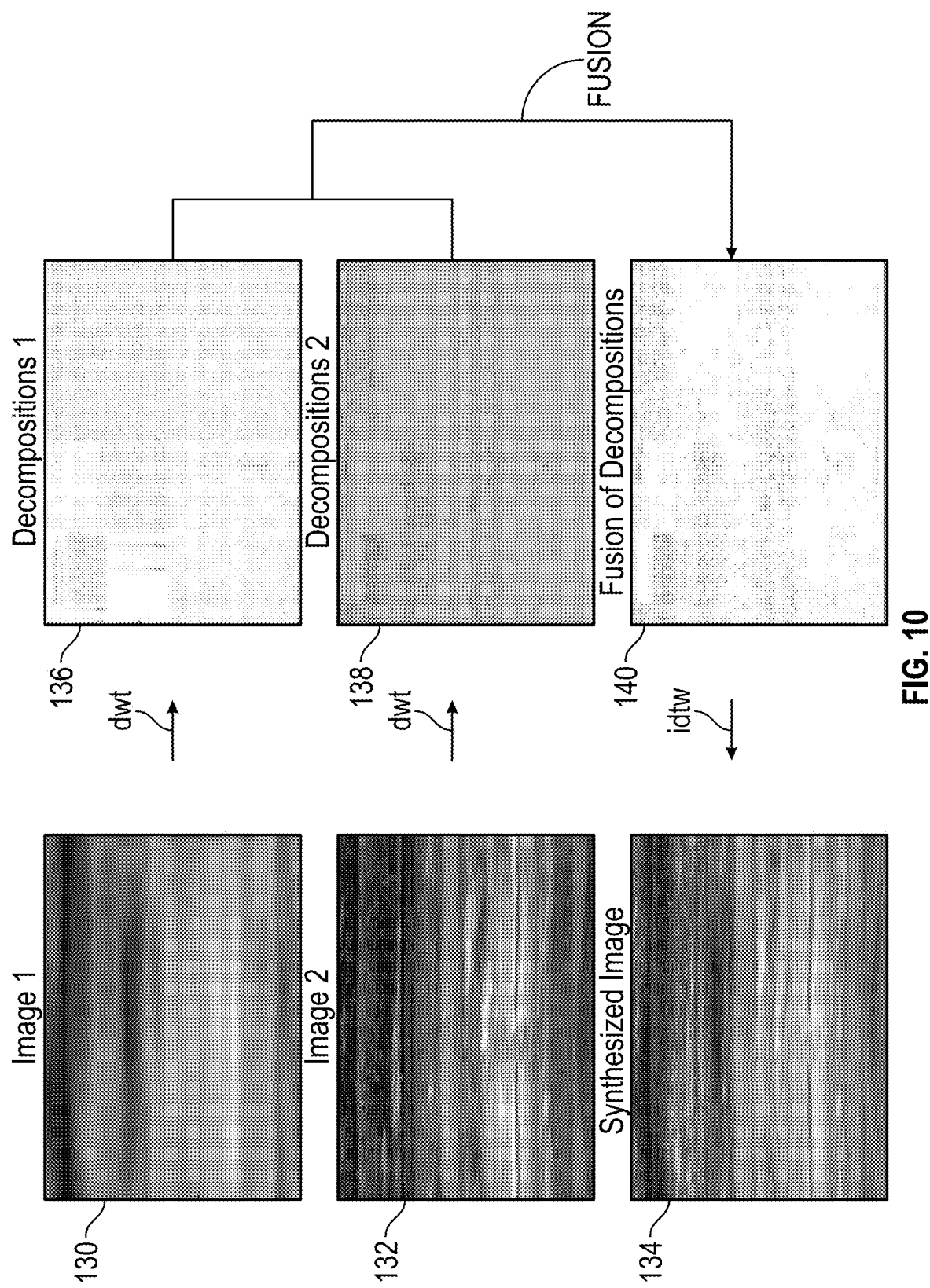
FIG. 10 shows a schematic illustration for pan sharpening a color composite image, in accordance with aspects of the present disclosure.

As a non-limiting example to help illustrate the elements in the flow diagram 122, FIG. 10 illustrates a method to perform pansharpening of a first image 130 representative of one or more of wellbore properties with a second image 132 also representative of one or more of wellbore properties to generate a pansharpened composite image 134. As discussed herein, the first image 130 may be a color composite image.

In general, FIG. 10 shows the first image 130 and the second image 132 are decomposed into a first coarse parts and detail parts. The detailed part 136 of the first image 130 is shown, and the coarse part 138 of the second image 132 are shown. More specifically, the coarse part of the first image 130 decomposition is replaced with the coarse part of the second image 132, and finally the inverse transform creates the pansharpened composite image 134. This technique may produce images with excellent spatial quality. Further, there are no tuning parameters other than number of levels of decomposition, which may be set to 2 and the type of filter (ERDAS software use as standard the Daubechies filter of length 2).

Figure 11:
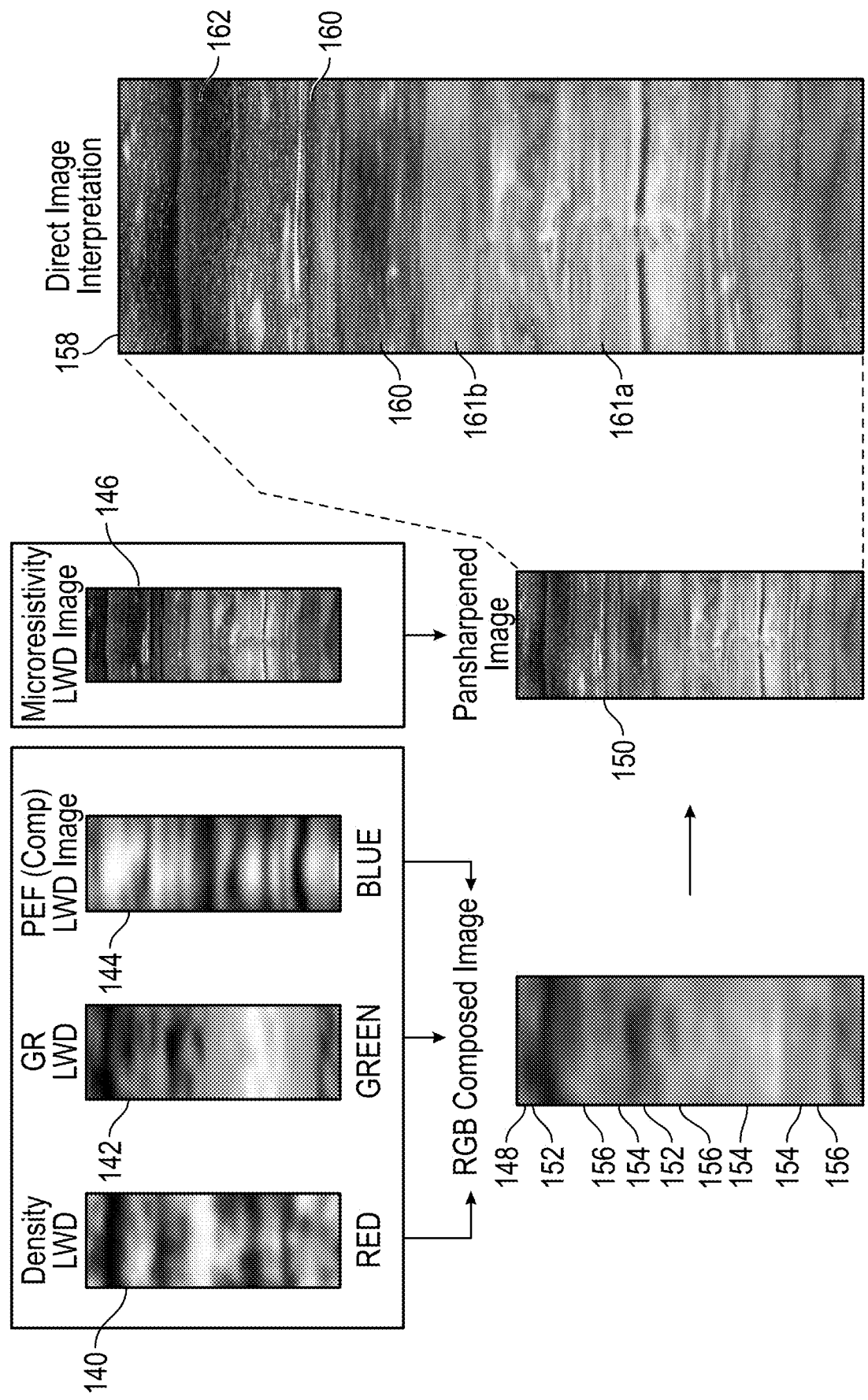
FIG. 11 shows a color composite image and a pansharpened composite image, in accordance with aspects of the present disclosure.

As another non-limiting example to help illustrate the elements in flow diagram 122, FIG. 11 shows the images 140, 142, 144, and 146 used to generate a color composite image 148 and a pansharpened image 150. The images 140, 142, and 144 were generated using density log data, gamma ray spectroscopy data, and photoelectric measurements, respectively. As discussed herein, the pansharpened image 150 may be generated using the color composite image 148 and a higher resolution image 146, such as an image representative of microresistivity of the formation. In this illustrative example, the image 146, which was obtained from microresistivity measurements.

The pansharpened image 150 shows distinct lithological regions such as 152, 154, and 156 that may not be readily observed in the images 140, 142, and 144 as already discussed in relationship with FIG. 4. Further, on the pansharpened image 150, which was generated based on the color composite image 148 and the image 146, further geological features are observed: such as the texture of the formation (massive 161b or laminated 161a layer for instance), the composition and heterogeneities of layers as shown by arrows 160) or the porosity—as can be seen in particular by the dots in layer 162. As such, the transforming the images 140, 142, and 144 into the color composite image 148, or transforming the images 140, 142, 144, and 146 into the pansharpened image 150 may facilitate detection of geological or petrophysical features (e.g., properties) that may not be observable using the images and/or the well log data alone.

Another aspect of the present disclosure is directed towards object-based image analysis of well log data. For example, well log data may be indicative of various geological features such as lithological regions, hydrocarbon deposits, types of rocks, boulders, and the like. The geological properties may be identified using the well log data as discussed herein. It is presently recognized that properties of the pixels within the image data may be used to automatically identify geological properties. That is, various regions of the well log data can be extracted and measured to facilitate in automated or assisted geological interpretation. Objects may be characterized in shape, texture and spectrum (content), the last depend by which information each band layer is storing and that can be designed as fit-for-purpose.

In general, image data may contain pixel values (e.g., intensity data, intensity values and location coordinates) that are useful for the classification of an object-based on intensity-based features. For example, the pixel values might be indicative of the color of an object. Intensity based features may be derived by first or higher order statistic and may include but are not limited to mean, median, min, max, standard deviation, volume-histogram-based features, grey-level co-occurrence and grey-level run-length features. The pixel values might also be useful in identifying an object-based on its shape and/or morphology. Morphological features may include but as not limited to length, radius, area, volume, perimeter, ellipticity, border, speculation, punctate, branching, blobness, distance, overlap, spread, orientation, etc. For example, various segmentation or image processing algorithms might use the clustering of pixels of similar intensities, or the difference in pixel intensities, or both, to determine shapes or morphology of objects.

Figure 12:
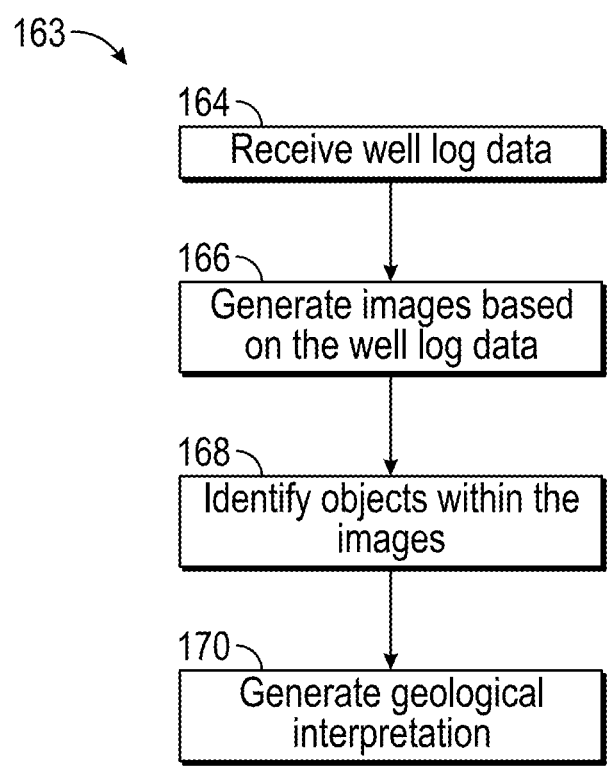
FIG. 12 is a block diagram for object-based image analysis of well log data, in accordance with aspects of the present disclosure.

FIG. 12 is a flow diagram 163 for generating a geological interpretation in accordance with aspects of the present disclosure. The elements illustrated in the flow diagram may be performed by the data processing system 28 or any suitable device. In general, the color composite image is generated using data from multiple well logs as explained beforehand. Moreover, the color composite image may be generated in real-time.

The flow diagram 163 may include received (process block 164) well log data. The flow diagram 163 may also include generating (process block 166) image based on the well log data. Further, the flow diagram 163 may include identifying (process block 168) objects within in the images. Further still, the flow diagram 163 may include generating (process block 170) geological interpretation.

Figure 13:
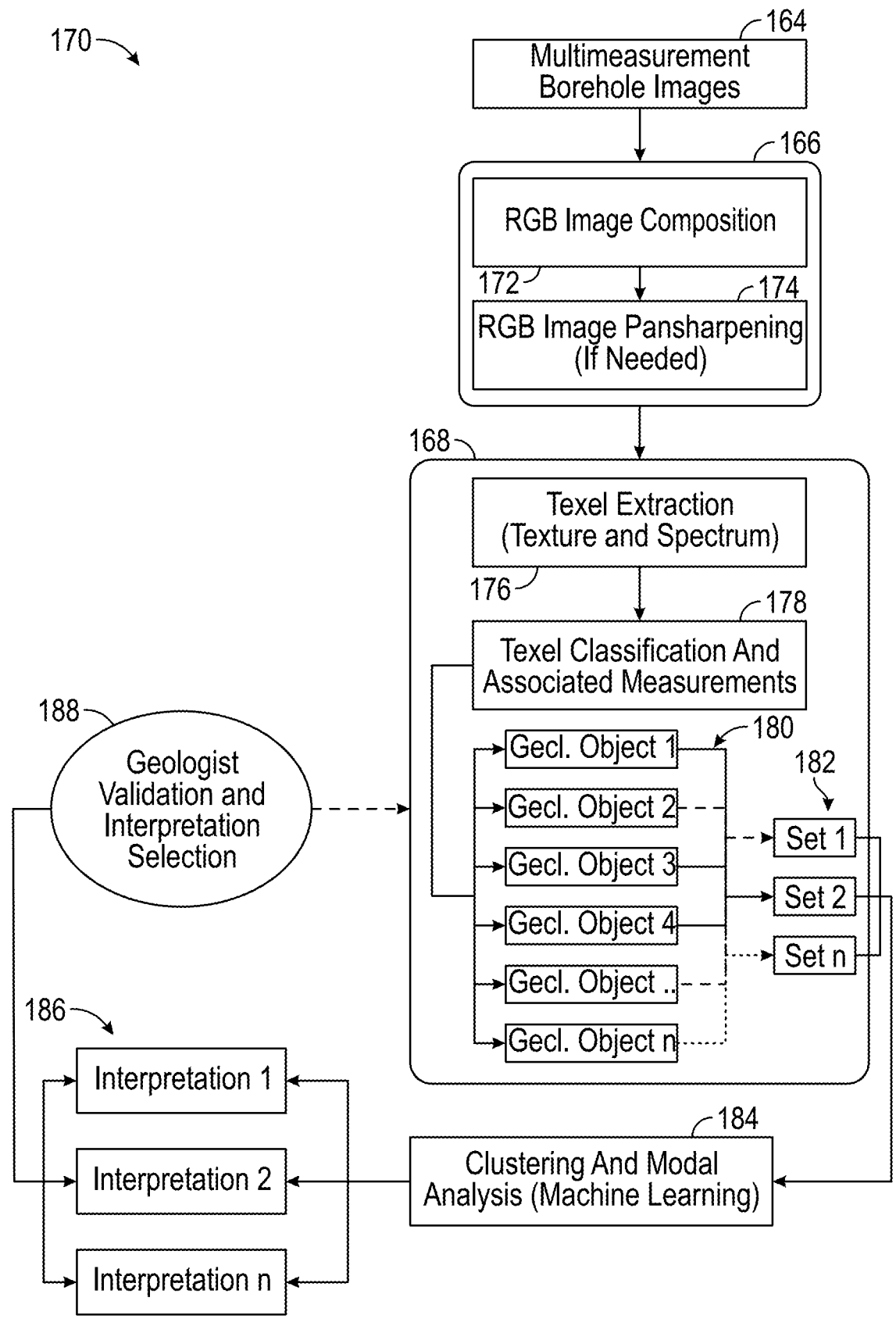
FIG. 13 is a flow diagram for object-based image analysis with feedback from an operator, in accordance with aspects of the present disclosure.

FIG. 13 is block diagram 171 for generating geological interpretation with additional elements than the flow diagram 163, in accordance with aspects of the present disclosure. The flow diagram 163 may include received (process block 164) well log data. After receiving the well log data, the flow diagram 163 may include generating (process block 166) one or more images based on the well log data. Generating the one or more images may include generating (process block 172) a color composite image, as discussed herein with respect to FIGS. 2-8. Further, in some embodiments, process block 166 may include generating (process block 174) pansharpened image, as discussed herein with respect to FIGS. 9-11.

After generating one or more images, the flow diagram 163 may include identifying (process block 168) objects within the images. In some embodiments, process block 168 may include receiving one or more images processed by certain other techniques, and identifying the objects within those images. In general, identifying objects within the images may include one or more elements such as extracting (process block 176) texels (e.g., components of images that are indicative of textures), shape, and the spectra within the image (derived from value of the pixels in the color space). Further, identifying objects within the image may include classifying (process block 178) based on the above-mentioned elements.

For example, an image having multiple pixels may have multiple subsets of the pixels that have one or more common feature vectors. A feature of a subset of pixels is a descriptor representative of said subset, including for instance the average color of the subset on each axis, the variance of such color within the subset, a number of pixel of the subset in each direction of the image, etc. A feature vector is a vector grouping all of the values of the features that has been chosen to analyze the image for said subset of pixels.

As such, each of the subset sharing common feature vectors may be grouped into a class. That is, one or more subsets within the image may have a similar texture, shape (e.g., as discussed above), spectrum (e.g., or spectra for embodiments using multiple spectra to generate the images), or any combination thereof. In the context of well log data, and referring briefly back to FIG. 8, certain regions (e.g., subsets of pixels) within an image that have components in certain color spaces may be indicative of a composition of a geological formation, such as quartz, dolomite, calcite, salt, and anhydrite. Referring briefly, to FIG. 11, different lithological regions (e.g., 152, 154, and 156) may be recognized or identified in the color composite image 148, the pansharpened image 150, and the magnified image 158 based on both certain shape characteristics and color values. As such, it should be appreciated that objects may be classified by any number of feature vectors.

Continuing with FIG. 13, each of the objects classifications that were generated process block 178 may be used to classify at least a portion of the objects identified in the image. In the context of analyzing well log data, such objects may include sand layers, clay level, clay clast, cross beddings, fractures, faults, vug, conglomerate boulders.

In accordance with the present disclosure, objects observable (e.g., identified) in a borehole images may be grouped three categories of primitives: 1) Bands (Layers) 2) Areal Heterogeneities, and 3) Linear Heterogeneities. The order illustrated in the list above reflect their hierarchy order: layers are the actual background used to define heterogeneities and their subsets. The relationship between those elements is used to define either "subsets" and "superset". In general, a classification scheme may include various supersets having subsets and/or additional supersets. Objects within an image are identified based on having certain feature vectors and each object is classified into a superset and, subsequently, one or more subsets that further characterize the object.

More specifically, Subsets may any sub-classification that may lead to different geological element or interpretation for each one of the three main classes, for example the spectral fingerprint of objects similar in shapes (e.g. vugs filled with water or oil). Supersets are may refer to an ensemble of classes and subclasses that may be associated to a geological facies observable in a studied interval. In some embodiments, this "geological objects set" (facies) may be upscaled and used to feed a geological conceptual model at reservoir scale without losing the details and without producing an unmanageable size of data. As certain objects may be extracted, classified, and placed in the 3D space, one embodiment of the present disclosure may be utilizing a classification scheme that depicts a geological facies topological law.

Figure 14:
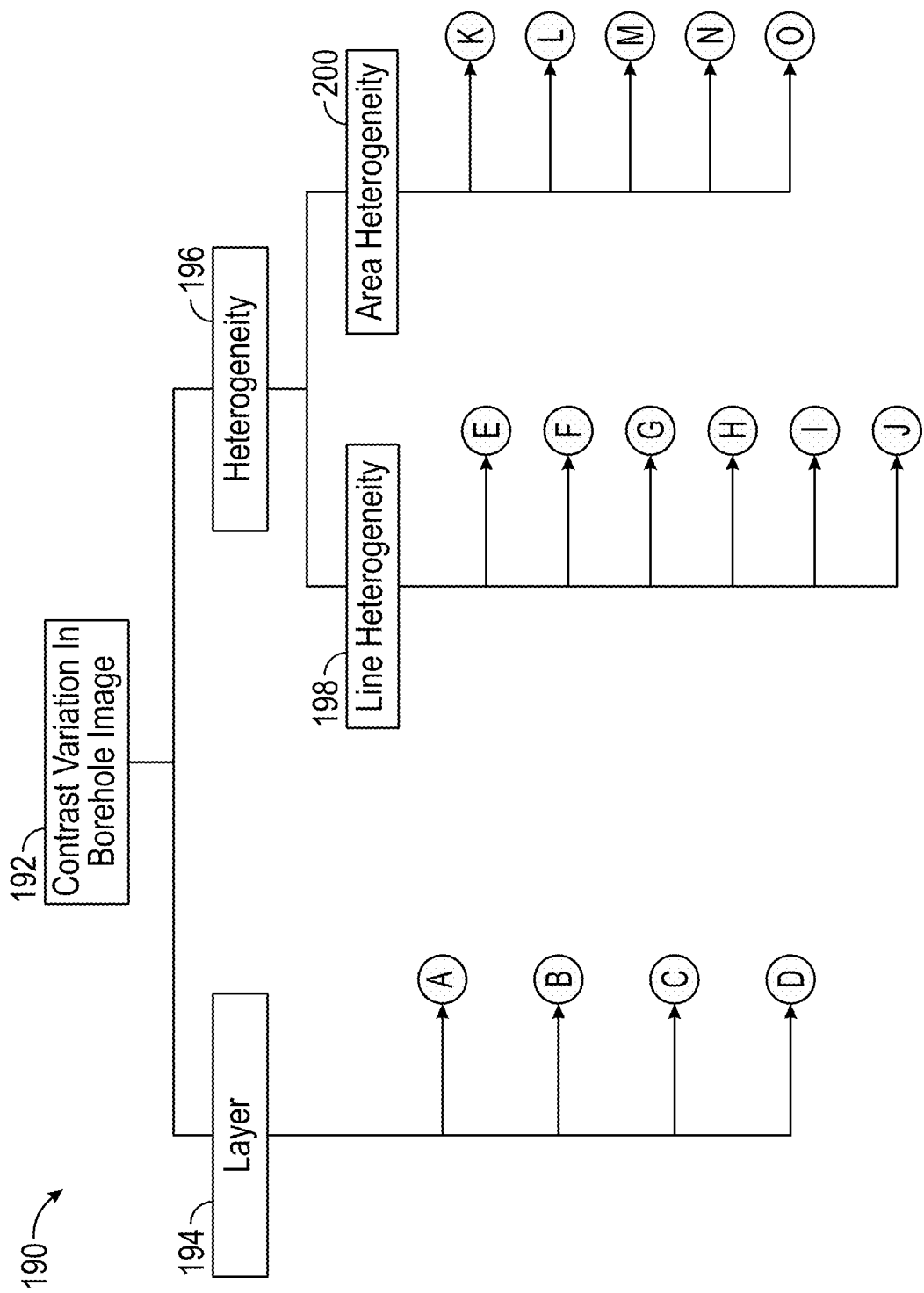
FIG. 14 is a flow diagram for object-based image analysis, in accordance with aspects of the present disclosure.

One embodiment of classification scheme 190, in accordance with the aspects of the present disclosure, is shown in FIG. 14. In general, the classification scheme 190 shown in FIG. 14 depict a non-limiting example of certain textural contents that may relate with real world geological objects. That is, the classification scheme 190 shows a general scheme of classifying and/or characterizing objects. In some embodiments, information of a multiband image depth may be included on another axis. In some embodiments, each element of the proposed classification may be characterized and measured also by its spectrum (e.g., content).

As shown in FIG. 14, based on contrast variation (e.g., varying textures, shapes, color, spectrum, and the like) or feature vectors in a borehole image, an object may be identified and subsequently classified. In accordance with an embodiment of the present disclosure, the morphological classification scheme 190 may include classifying an object as a layer 194 (e.g., a region of a subsurface having a generally uniform composition) or as a region of heterogeneity 196, such as having linear heterogeneity 198 or areal heterogeneity 200. In some embodiments, the morphological classification scheme may include spectral content, such as what is generally shown in FIG. 8, and discussed herein. For example, objects may be classified based on a color of at least a portion (e.g., one or multiple pixels, a region of pixels, and/or the like) of the color composite image and/or a shape of the portion that is indicative of a property and/or a composition of a formation. With respect to the color of at least a portion, in some embodiment, this may include comparing a contrast between two locations and/or determining a texture of the portion based on a variation of pixel values within the portion. With respect to the shape of the portion, in some embodiments, the shape may be a thickness of a layer, ellipticity, roundness, porosity, feature crossing, and the like.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A system, comprising:
a processor; and
a memory storing instructions configured to be executed by the processor, the instructions comprising instructions to:
receive a first borehole image data related to a first type of well log data representative of a first parameter of a borehole, wherein the first borehole image data comprises a first plurality of pixels;
receive a second borehole image data related to a second type of well log data representative of a second parameter of the borehole, wherein the second borehole image data comprises a second plurality of pixels, wherein a location in the borehole associated with one or more of the first plurality of pixels corresponds to the same location in the borehole associated with one or more of the second plurality of pixels; and
generate a color composite borehole image data based at least in part on a transformation of the first borehole image data and the second borehole image data into different axes of a color space.

2. The system of claim 1, wherein the transformation comprises transforming each pixel value of at least a portion of the first plurality of pixels into a first axis of the color space to modify the first borehole image data; and
transforming each pixel value of at least a portion of the second plurality of pixels into a second axis of the color space to modify the second borehole image data.

3. The system of claim 2, wherein transforming each pixel value of at least a portion of the first plurality of pixels comprises normalizing each pixel value of at least the portion of the first plurality of pixels based at least in part on the color space and a dynamic range of a first sensor associated with the first type of data; and
wherein transforming each pixel value of at least a portion of the second plurality of pixels comprises normalizing each pixel value of at least the portion of the second plurality of pixels based at least in part on the color space and a dynamic range of a second sensor associated with the second type of data.

4. The system of claim 2, where the transformation of the first borehole image data and the second borehole image data into a different axes of the color space comprises a linear transformation, a non-linear transformation, or both.

5. The system of claim 1, wherein the instructions comprises identifying a geological or petrophysical characteristic of the geological formation based at least in part on a value of at least one pixel of the color composite image data, a shape of a subset of pixels of the color composite image data, a difference between values of the subset of pixels and values of an additional subset of pixels, or any combination thereof.

6. The system of claim 5, wherein the geological or petrophysical characteristic comprises a
lithology of the formation, comprising one or more of layer composition and layer boundaries, identification of heterogeneities, comprising one or more of vugs or fractures, texture of the formation, porosity, rugosity, fluid typing, or any combination thereof.

7. The system of claim 5, wherein identifying a geological or petrophysical characteristic comprises classifying each subset of pixel into a class based on feature vectors representative of one or more of the shape of a subset of pixels of the color composite image data, a difference between values of the subset of pixels and values of an additional subset of pixels, or any combination thereof.

8. The system of claim 1, receiving a third borehole image data related to a third type of well log data representative of a third parameter, wherein the third borehole image data comprises a third plurality of pixels;
transforming each pixel value of at least a portion of the third plurality of pixels into a third axis of a color space to generate a modified third borehole image data; and
wherein the color composite borehole image data is based at least at least in part on a combination of the modified first borehole image, the modified second borehole image, and the modified third borehole image.

9. The system of claim 1, wherein at least one of the first borehole image data, the second borehole image data, and the third borehole image data comprises an image representative of a gamma-ray count emitted by the formation, an image representative of a photoelectric factor of the formation, an image representative of a resistivity of the formation, an image representative of a dielectric parameter of the formation, or an image representative of a standoff between a downhole tool and the formation, or any combination thereof.

10. The system of claim 1, wherein the first borehole image data is a composite image data based at least in part on a combination of multiple types of image data associated.

11. The system of claim 1, comprising generating a pansharpened borehole image data based on least in part on a combination of the color composite borehole image data and a fourth borehole image data related to a fourth image data representative to a fourth parameter of the borehole.

12. A method, comprising:
receiving a first borehole image data related to a first type of well log data representative of a first parameter of a borehole, wherein the first borehole image data comprises a first plurality of pixels;
receiving a second borehole image data related to a second type of well log data representative of a second parameter of a borehole, wherein the second borehole image data comprises a second plurality of pixels;
receiving a third borehole image data related to a third type of well log data representative of a third parameter of a borehole, wherein the third borehole image data comprises a third plurality of pixels,
wherein a location within a geological formation associated with one or more of the first plurality of pixels, one or more of the second plurality of pixels, and one more of the third plurality of pixels at least partially overlaps; and transforming each pixel value of at least a portion of the first plurality of pixels into a first axis of a color space to generate a modified first borehole image data;

transforming each pixel value of at least a portion of the second plurality of pixels into a second axis of the color space to generate a modified second borehole image data;

transforming each pixel value of at least a portion of the third plurality of pixels into a third axis of a color space to generate a modified third borehole image data; and generating a color composite borehole image data based at least in part on a combination of the modified first borehole image, the modified second borehole image, and the modified third borehole image; and generating a pansharpened borehole image data based on least in part on a combination of the color composite borehole image data and a fourth borehole image data related to a fourth type of well log data.

13. The method of claim 12, wherein generating a color composite borehole image includes converting a color composite image generated in an intermediate color space to an HSV composite image.

14. The method of claim 12, wherein the color composite image is the HSV composite image; and
wherein the generating the pan sharpened borehole image data comprises replacing a value component of the HSV composite image with at least a portion of the fourth borehole image data.

15. The method of claim 12, comprising identifying a geological characteristic, a location, or any combination thereof within a geological formation based on at least in part on a subset of pixels of the pansharpened borehole image data.

16. A method for identifying one or more geological features using a color composite borehole image, comprising:

receiving a first borehole image data related to a first type of well log data representative of a first parameter of a borehole, wherein the first borehole image data comprises a first plurality of pixels;

receiving a second borehole image data related to a second type of well log data representative of a second parameter of a borehole, wherein the second borehole image data comprises a second plurality of pixels;

receiving a third borehole image data related to a third type of well log data representative of a third parameter of a borehole, wherein the third borehole image data comprises a third plurality of pixels;

wherein a location of one or more of the first plurality of pixels correlates to a location of one or more of the second plurality of pixels; and transforming each pixel value of at least a portion of the first plurality of pixels into a first axis of a color space to generate a modified first borehole image data;

transforming each pixel value of at least a portion of the second plurality of pixels into a second axis of the color space to generate a modified second borehole image data;

transforming each pixel value of at least a portion of the third plurality of pixels into a third axis of a color space to generate a modified third borehole image data;

generating the color composite borehole image based at least in part on a combination of the modified first borehole image data, the modified second borehole image data, and the modified third borehole image data; and identifying the one or more geological features within the color composite borehole image based at least in part on identified feature vectors of at least a portion of a plurality of pixels of the color composite borehole image.

17. The method of claim 16 further comprising generating a pansharpened borehole image based on least in part on a combination of the color composite borehole image and a fourth borehole image data related to a fourth type of well log data; and identifying one or more additional geological features within the pansharpened borehole image based at least in part on identified features of at least a portion of a plurality of pixels of the pansharpened borehole image.

18. The method of claim 17, wherein identifying the one or more additional geological features within the color composite borehole image comprises assigning features vectors to a plurality of subsets of pixels within the color composite borehole image based at least in part on a shape, color, contrast, or any combination thereof of each of the plurality of subsets of pixels.

19. The method of claim 16, wherein the method comprises grouping the subsets of pixels into one or more classes based on the values of the feature vectors associated to said subsets.

20. The method of claim 19, wherein the subsets of pixels are grouped into classes representative of a band, an areal heterogeneity and a linear heterogeneity.

* * * * *